United States Patent [19]

Boutant

[11] 4,093,244
[45] June 6, 1978

[54] STUFFING-BOX SEAL PARTICULARLY FOR ROTATING SHAFTS

[75] Inventor: Jean-Jacques Boutant, 44, rue Charles Drot 92500, Rueil-Malmaison, France

[73] Assignee: Regie Nationale Des Usines Renault, Boulogne Billancourt, France

[21] Appl. No.: 757,733

[22] Filed: Jan. 7, 1977

[30] Foreign Application Priority Data

Jan. 26, 1976 France .................. 76 01955

[51] Int. Cl.² ........................................... F16J 15/18
[52] U.S. Cl. ............................................... 277/153
[58] Field of Search ................. 277/42, 43, 152, 153; 308/36.1, 187.1, 187.2

[56] References Cited

U.S. PATENT DOCUMENTS

| | | | |
|---|---|---|---|
| 3,099,454 | 7/1963 | Walinski | 277/152 |
| 3,294,456 | 12/1966 | Williams | 308/36.1 |
| 3,663,076 | 5/1972 | Valente | 308/36.1 |
| 3,961,829 | 6/1976 | Bowen | 308/36.1 |

Primary Examiner—Herbert F. Ross
Attorney, Agent, or Firm—Oblon, Fisher, Spivak, McClelland & Maier

[57] ABSTRACT

A stuffing-box seal for rotating shafts having a retaining sleeve for a ring seal which constitutes the seat for two caps disposed axially on the rotating shaft which insure centering of the ring seal, the centering caps having bearing surfaces contacting the rotating shaft at the opposing axial ends of the ring seal and being appropriately bonding with the retaining sleeve.

5 Claims, 1 Drawing Figure

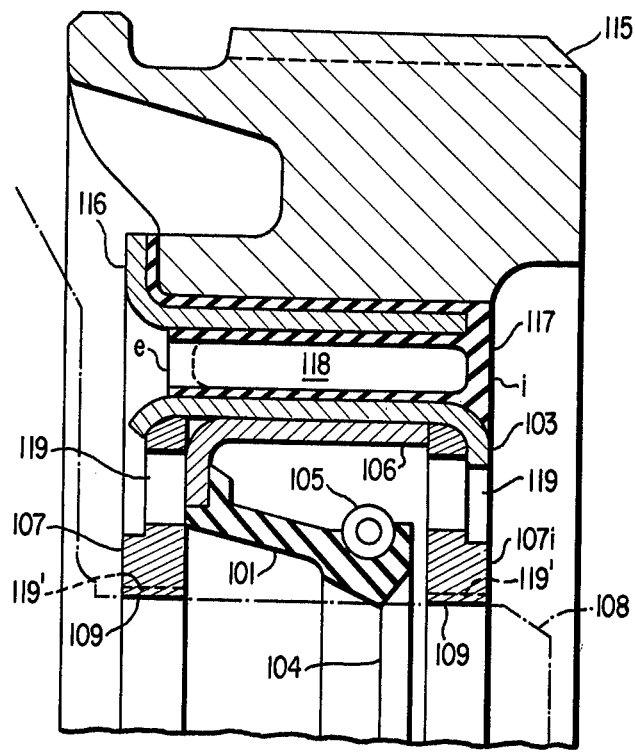

STUFFING-BOX SEAL PARTICULARLY FOR ROTATING SHAFTS

BACKGROUND OF THE INVENTION

The present invention relates generally to sealing shafts coming out of differential mechanisms and more particularly to an improvement in stuffing-box seals for rotating shafts.

More particularly, the invention concerns a stuffing-box seal comprising a ring seal, a retaining sleeve for the ring seal, an external housing and a centering pad integral with the external housing and with the ring-seal retaining sleeve.

SUMMARY OF THE INVENTION

An object of the present invention is to provide a stuffing-box of the type characterized in which proper alignment of the ring seal during rotation of the shaft is insured and the device is more compact than heretofore known devices of the same character.

In accordance with at least one aspect of the present invention, the retaining sleeve for the ring seal receives two centering caps located at the two ends of the ring. The stuffing-box seal thus realized will preferably be provided with centering caps made of a material impregnated with a suitable lubricant. This will prevent seizure of the bearing surfaces of the centering caps in contact with the shaft.

BRIEF DESCRIPTION OF THE DRAWING

Other characteristics and advantages of the stuffing-box seal of the present invention will be more fully appreciated as the same becomes better understood from the following detailed description of a preferred embodiment when considered in connection with the sole FIGURE, which shows a partial section of the seal.

DETAILED DESCRIPTION OF THE ILLUSTRATED EMBODIMENT

The stuffing-box seal shown in the sole Figure includes a ring seal 101 situated within a retaining sleeve 103 forming a cylindrical enclosure. The ring seal 101 has a radial lip 104 against which a spring 105 presses. The ring seal 101 can, if necessary, be bonded to a backing 106 which increases its resistance to pressure. The retaining sleeve 103 is bounded axially by the radial caps 107, 107i intended for facilitating alignment of the radial lip 104 on a rotating shaft 108, shown in dashed lines.

According to the configuration shown, the rotary shaft 108 is in contact with bearing surfaces 109 of the caps 107, 107i, and is an element of a drive train, preferably being integral in rotation with a planetary gear disposed inside the case of a differential mechanism.

The case, not shown, has a cylindrical hole which receives a threaded support 115, which holds the stuffing-box assembly.

The threaded support 115 is bored and holds an external housing 116 of the stuffing-box. The external housing 116 is connected with a flexible centering sleeve 117 by the bonding of the sleeve to both the external housing 116 and the retaining sleeve 103. The flexible sleeve 117 is concentric with the external housing 116 and the retaining sleeve 103 and has essentially the same axial extent. To increase the flexibility of sleeve 117, the latter is made with an external and an internal wall cooperating to form cellular chambers 118 uniformly distributed over the periphery of the sleeve and opening out axially and alternately at the opposing axial faces e and i of the sleeve.

The retaining sleeve for ring seal 101 receives the two centering caps 107, 107i located at the two ends of the ring seal and held apart by it or by its backing 106. The axial extent of the stuffing box is thus limited to the length of the flexible centering sleeve.

In order to limit the risk of seizure of the shaft 108 at the contacts with the bearing surfaces 109 of the caps, the latter are made of porous fritted bronze impregnated with a lubricant material mixed with an antifriction substance.

In another embodiment of the stuffing box, a centering cap 107i has a set of orifices 119 and grooves 119' for supplying lubricant to the radial sealing lip 104 and to the bearing surfaces 109 of the caps 107, 107i. This prevents excessive heating of the lip 104, as well as the risk of seizure of the cap at its contact with the shaft.

As is seen from the embodiment illustrated herein, the two caps 107, 107i may be identical, but the ring seal 101 blocks only the orifices 119 communicating with the exterior of the case, not shown. Lubricant is thus supplied to the radial sealing lip 104 only by the orifices and grooves of the cap 107i on its inner side.

Obviously, other modifications and variations of the present invention are possible in light of the above teachings. It is therefore to be understood that within the scope of the appended claims, the invention may be practiced otherwise than as speficically described herein.

What is claimed as new and desired to be secured by Letters Patent of the United States is:

1. A stuffing-box seal particularly adapted for rotating shafts, comprising:
    a ring seal;
    a retaining sleeve for said ring seal;
    an external housing;
    a centering sleeve bonded together with said external housing and said retaining sleeve; and
    two centering caps located at the opposing axial ends of said ring seal being held by said retaining sleeve wherein one of said centering caps has a set of orifices and grooves for supplying lubricant to a sealing lip of said ring seal.

2. A stuffing-box seal particulary adapted for rotating shafts, comprisng;
    a ring seal;
    a retaining sleeve for said ring seal;
    an external housing;
    a centering sleeve bonded together with said external housing and said retaining sleeve; and
    two centering caps located at the opposing axial ends of said ring seal being held by said retaining sleeve wherein said retaining sleeve of said ring seal is bonded together with said centering caps and said caps are held apart by a backing of said ring and wherein said caps have self-lubricating cylindrical bearing surfaces for receiving said rotating shaft.

3. A stuffing-box seal particularly adapted for rotating shafts, comprising;
    a ring seal;
    a retaining sleeve for said ring seal;
    an external housing;
    a centering sleeve bonded together with said external housing and said retaining sleeve; and two centering caps located at the opposing axial ends of said ring seal being held by said retaining sleeve wherein said retaining sleeve of said ring seal is bonded together with said centering caps and said caps are held apart by a backing of said ring and wherein said centering caps are made of a frited material.

4. A stuffing-box seal particularly adapted for rotating shafts, comprising;

a ring seal;

a retaining sleeve for said ring seal;

an external housing;

a centering sleeve bonded together with said external housing and said retaining sleeve; and two centering caps located at the opposing axia ends of said ring seal being held by said retaining sleeve wherein said retaining sleeve of said ring seal is bonded together with said centering caps and said caps are held apart by a backing of said ring and wherein said centering caps are made of a polyamide material mixed with an antifriction substance.

5. A stuffing-box seal as set forth in claim 1, wherein said centering sleeve includes an external and internal wall cooperating to form a cellular chamber.

* * * * *